United States Patent [19]
Tatsumi

[11] 3,978,373
[45] Aug. 31, 1976

[54] CIRCUIT BREAKER
[75] Inventor: Hideo Tatsumi, Hitachi, Japan
[73] Assignee: Hitachi, Ltd., Japan
[22] Filed: Jan. 27, 1975
[21] Appl. No.: 544,263

[30] Foreign Application Priority Data
Jan. 30, 1974 Japan.................................. 49-11831

[52] U.S. Cl.................................. 317/18 D; 317/20;
322/59; 322/69; 322/77
[51] Int. Cl.²...................... H02H 3/28; H02H 7/06
[58] Field of Search................. 317/18 D, 18 R, 20,
317/13 R; 322/27, 28, 59, 69, 73, 77, DIG. 2;
321/11, 26; 340/255

[56] References Cited
UNITED STATES PATENTS

| | | |
|---|---|---|
| 3,312,862 | 4/1967 | Currin........................... 317/18 R X |
| 3,351,812 | 11/1967 | Cutler et al....................... 322/69 X |
| 3,496,414 | 2/1970 | Logston, Jr. ...................... 317/13 R |
| 3,656,049 | 4/1972 | Hazumi................................ 322/27 |
| 3,775,666 | 11/1973 | Smith............................... 322/73 X |

Primary Examiner—J D Miller
Assistant Examiner—Patrick R. Salce
Attorney, Agent, or Firm—Craig & Antonelli

[57] ABSTRACT

A leakage current detecting coil is provided in the output circuit of the armature of a generator. The output of the leakage current detecting coil is connected to a gate control circuit for a pair of thyristors constituting a full-wave rectifier circuit provided between the output of the generator and the field coil thereof. The full-wave rectifier circuit controls the exciting current of the generator and also interrupts the exciting current through turning-off the thyristors when the leakage current is detected.

5 Claims, 2 Drawing Figures

CIRCUIT BREAKER

BACKGROUND OF THE INVENTION

1. FIELD OF THE INVENTION

The present invention relates to a circuit breaker operating on leakage occurrence, and more particularly to a circuit breaker suitable for a synchronous generator using semiconductor voltage control system.

2. DESCRIPTION OF THE PRIOR ART

Generally, a circuit breaker operating on leakage occurrence (hereinafter, which is called as a leakage operating breaker) is necessarily provided in the generator or the associated lead circuit for purpose of preventing an electric shock and fire when leakage, for example, due to poor insulation, occurs in the synchronous generator circuit.

A conventional leakage operating breaker is constructed such that the leakage current detected by the coil is applied through the semiconductor amplifier to a mechanically constructed relay for quick circuit interruption, which is generally rated at 15 mA in interruption current and less than 0.1 sec. in tripping, and is used in connection with breakers.

The conventional leakage operating breaker is complicated due to its associated amplifier and quick circuit interruption device, resulting in a high manufacturing cost, and becomes large in size, two or three times, for example, the conventional one. The fact that a mechanical switch which is not so frequently operated is used results in poor reliability. This partly prevents the use of such a leakage operating breaker. With the recent trend of safety requirements for the electric appliance, however, the need of the leakage operating breaker of such type increases and thus an economic and compact leakage operating breaker is highly desired.

SUMMARY OF THE INVENTION

Accordingly, an object of the present invention is to provide a leakage operating breaker which is economic and compact, and thus has an improved space factor.

Another object of the present invention is to provide a leakage operating breaker easily used in cooperation with a rectifier with an electrode as a voltage controller in the generator exciting circuit.

In the present invention, thyristors (or transistors) for controlling the exciting circuit in the semiconductor voltage control system for a synchronous generator is directly used as a circuit breaker in such a manner that leakage current detected directly or indirectly turns off the thyristors. By this, an electric shock or fire is prevented when the leakage occurs.

DESCRIPTION OF THE PREFERRED EMBODIMENT

The present invention will be described in detail with reference to the accompanying drawings.

Figure 1:
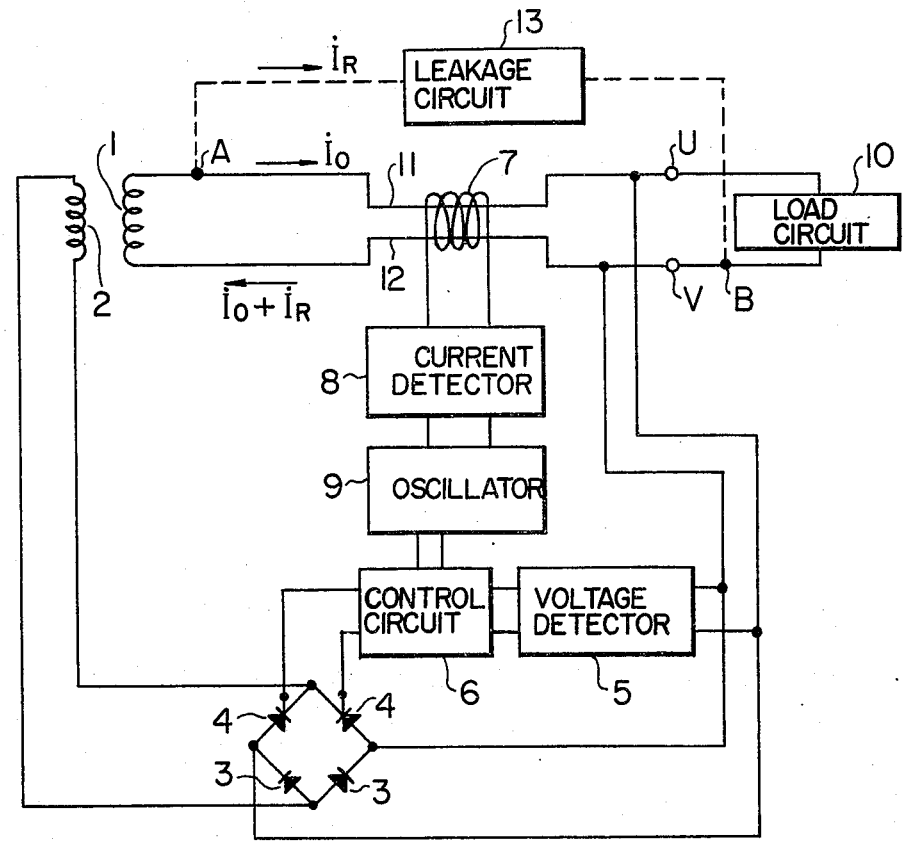
FIG. 1 is a block diagram of a leakage operating breaker when it is applied to a synchronous motor as an embodiment of the present invention.

Referring now to FIG. 1, there is shown an embodiment of the leakage operating breaker according to the present invention when it is applied to a synchronous generator. In the drawing, the reference numeral 1 designates an armature coil, 2 an exciting coil, 3 and 4 diodes and SCR's, respectively constituting a bridge circuit for feeding the exciting coil 2, 5 a voltage detecting circuit constituting a voltage regulator to maintain an ac voltage across the armature coil 1 to a predetermined fixed value, and 6 a control circuit also constituting the voltage regulator and supplying a control signal to the SCR's 4 to control the exciting current flowing through the exciting coil 2. The control circuit 6 includes an oscillating circuit for firing the SCR's 4, whose oscillation is initiated by an application thereto of a small voltage induced by a slight residual magnetism residing in the magnetic circuit associated with the generator. Upon oscillation, the SCR's 4 are fired to be conductive permitting an initial current to flow through the exciting coil 2 for establishing a required voltage thereacross. The reference numeral 7 designates a detecting coil used for detecting a leakage current, which will be described more in detail hereinafter.

When a load circuit 10 is connected across output terminals U and V of the synchronous generator, assumption is made for the thus constructed circuit that a leakage current $I_R$ flows through a leakage circuit 13 illustrated by a dotted line which is formed between a part A of one of buses 11 and 12, for example the bus 11 and a part B of the load circuit 10. When a human body constitutes the leakage circuit 13, there is a danger of electric shock when the leakage current exceeds 15 to 30 mA. In such a case, an urgent and quick, at latest 0.5 second, for example, circuit interruption is absolutely necessary from a safety viewpoint.

Figure 2:
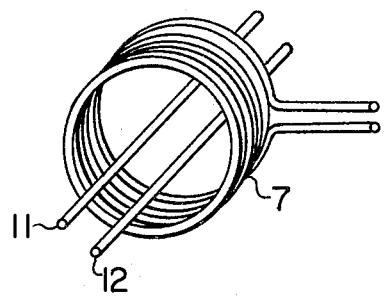
FIG. 2 is a perspective view a coil for detecting a leakage current which is used in the apparatus of FIG. 1.

The present invention is applied to the above-described circuit. The coil 7 is disposed in linking relation with both the buses 11 and 12 as shown in FIG. 2. Assume now again that the leakage current flowing through the leakage circuit 13 between A and B is $I_R$ and the current flowing through the output circuit is Io. In this case, the current flowing through the bus 11 is Io while that through the bus 12 is Io + $I_R$, and these currents are opposite in direction. Thus, the current flowing the buses enclosed with the coil 7 is given $$(Io + I_R) - Io = I_R \qquad (1)$$

As seen from the equation, the coil 7 may detect the current equal to the leakage current $I_R$.

As previously stated, the leakage current $I_R$ must be restricted to a small value below 15 to 30 mA for avoiding danger. For this reason, it is necessary to select a coil capable of detecting such a weak current. A multi-turned coil is preferable since, as well known, a coil of $n$ turns is able to amplify the leakage current $I_R$ to be detected to about $nI_R$.

When the coil 7 detects the leakage current exceeding a predetermined value, a current detector 8 amplifying the leakage current fed from the coil 7 operates an oscillator 9 which in turn operates the control circuit 6 to issue a control signal for turning off the SCR's 4. On application of the control signal, the SCR's 4 constituting the bridge circuit are instantaneously turned off with the result that the exciting current flowing through the exciting coil 2 is cut off and accordingly the voltage induced across the armature coil 1 is reduced to zero.

Since the leakage operating breaker according to the present invention is thus constructed, many advantages are obtained. A low cost and space saving breaker is attained due to no need of the use of the mechanically constructed breaker or cut-off switch. The use of a small capacity of cut-off switch is permitted due to the fact that not the main circuit but the exciting circuit is interrupted. The fact that the semiconductor device for voltage control which is always operated is used as the cut-off switch brings about a high reliability and quick interruption in the order of millisecond.

While SCR's have been employed as the voltage control device in the above-described embodiment, the control device using transistors may of course be usable in a like manner. It is to be noted, further, that a semiconductor switch may be inserted in series connection into the exciting circuit, for blocking the leakage current.

What is claimed is:

1. A circuit breaker used for a generator having an output circuit for feeding an output of the generator to an exciting coil of the generator through a bridge rectifier circuit including controlled semiconductor rectifier elements, means for detecting the output voltage of the generator, and a control circuit having an output connected with the control electrodes of the rectifier elements for controlling the rectifier circuit in accordance with an output of the output voltage detecting means, said circuit breaker comprising detecting means coupled to the generator output circuit for detecting a leakage current leaking out of the generator output circuit, said leakage current detecting means having an output connected with said control circuit, said control circuit interrupting feed of an exciting current to the exciting coil in response to the detection of the leakage current.

2. A circuit breaker according to claim 1, in which said leakage current detecting means is a ring shaped coil provided in linking relation with output lines of the generator.

3. A circuit breaker according to claim 1, wherein the exciting circuit is interrupted when the detected leakage current exceeds a predetermined value.

4. In a generator circuit comprising:
a generator having an armature winding for driving a load circuit;
a voltage detector circuit for detecting a load voltage across the load circuit and providing an output indicative thereof;
a control circuit responsive to the output of the voltage detector circuit for providing an output;
a semiconductor bridge circuit driven by the load voltage, said bridge circuit including controlled semiconductor elements responsive to the output of the control circuit;
a generator field winding driven by the semiconductor bridge circuit so that the load voltage is kept constant; the improvement comprising:
leakage current detector means for detecting a leakage current between the armature winding and the load circuit;
a current detector circuit means for determining when the leakage current value is greater than a predetermined value and driver circuit means for driving the control circuit so as to control the controlled rectifiers to interrupt the voltage to the field winding when the leakage current exceeds the predetermined value.

5. A generator circuit according to claim 4, wherein said leakage current detecting means is a ring shaped coil linked magnetically with the output lines of the generator.

* * * * *